3,058,875
BROMATE-BROMIDE-BISULFATE ANTI-MICROBIAL COMPOSITION

Robert D. Goodenough, Midland, Mich., assignor to The Dow Chemical Company, Midland, Mich., a corporation of Delaware
No Drawing. Filed Sept. 6, 1960, Ser. No. 53,867
8 Claims. (Cl. 167—17)

The invention relates to a new composition of matter. It contemplates the preparation of a solid granular composition which, upon subsequent intermixture with water, has antimicrobial effects.

Halogens, usually in the liquid state, e.g. chlorine, bromine, or iodine, have long been added to aqueous solutions to destroy or prevent the growth of microorganisms therein. Since the addition of the elemental halogen is often inconvenient and hazardous, attempts have been made to provide such halogen by addition of a compound which releases a halogen in situ.

It is known to admix a composition containing a soluble iodide, a soluble iodate, and a solid acid, e.g. an alkali metal bisulfate or acid phosphate or sulfamic acid, with an aqueous solution or water, whereupon iodine is released therein which inhibits the growth of microorganisms therein or in contact therewith. Such compositions have inherent disadvantages principal of which are those associated with its preparation, handling, and storage and its hygroscopic character which offers serious difficulties in maintaining the compositions in a dry condition. Some improvements over such compositions have been attempted among which is the replacement of the iodate, e.g. sodium iodate, by the complex salt, $$NaIO_3 \cdot 4Na_2SO_4$$

or $NaIO_3 \cdot 3Na_2SO_4$ as described in U.S. Patent 2,918,400.

Improved compositions containing such complex salts are limited to those comprising the iodide and iodate mixtures. For a vast number of uses involving inhibition of microbe growth, the bromine is preferred over the other halogens. Compositions comprising bromides and bromates, comparable to the iodide-iodate composition described above, are not available.

There is a need for a composition of matter containing a bromate and a bromide intermixed with an acidic material which is stable at atmospheric conditions but which releases bromine when admixed with water or an aqueous solution to provide antimicrobial effects. Such a composition which releases bromine in water or in an aqueous solution offers many advantages over a composition which releases iodine. The principal reason for preferring bromine-releasing materials over those of the iodine is due to the high efficacy of the bromine as an antimicrobial substance, to the fact that the bromine imparts little or no undesirable taste or odor to the water or aqueous solution thus treated, and has greater solubility in water. The use of a bromine-releasing composition in swimming pools, potable water sources, and the like is also preferred over the use of chlorine-releasing materials due to the relative instability of the chlorine-releasing substances and to the absence of known satisfactory methods of addition of such compounds to water.

There exists, accordingly, a need for a composition of matter, containing a bromate and bromide intermixed with an acidic material, which is safely and readily prepared, is stable upon storage and shipment, and is highly effective to arrest or inhibit microbial growth when admixed with aqueous solutions or water.

An object of the invention is to meet this need. The manner by which this and related objects are attained is set forth in the ensuing description and is specifically defined in the appended claims.

The invention, therefore, is a composition of matter which is stable under normal conditions of light, heat, and moisture and is highly effective as an antimicrobial composition for admixture with an aqueous solution or water, e.g. the water in swimming pools, potable water sources, toilet bowls, and the like. The composition consists of a water-soluble bromate, a water-soluble bromide, a soluble bisulfate and a soluble complex or double salt consisting of a bisulfate and a sulfate, e.g.

$$NaHSO_4 \cdot Na_2SO_4$$

The complex soluble bisulfate-sulfate salt need not be present in an amount greater than about 5 percent of the amount of sodium bisulfate employed. The most common ingredients employed in the preparation of the composition of the invention consists of sodium bromide, sodium bromate, sodium bisulfate and at least 5 and preferably at least 6 or 7 percent, by weight of the sodium bisulfate, of the complex salt $NaHSO_4 \cdot Na_2SO_4$. The bromate and bromide ingredients of the composition are preferably present in the stoichiometric quantity and the bisulfate in excess of the stoichiometric quantity set forth in the equation below:

$$NaBrO_3 + 5NaBr + 6NaHSO_4 \rightarrow 3Br_2 + 6Na_2SO_4 + 3H_2O$$

Such a composition, that is, the mixture of the three substances in the lefthand portion of the equation, and the aforesaid double salt, in an amount of at least 5 percent of the $NaHSO_4$, is substantially non-hygroscopic at atmospheric conditions. It is readily soluble in aqueous solutions and releases bromine therein to arrest microbial growth. As a concomitant beneficial effect, it removes iron oxide stains from surfaces contacted. Such a composition can be prepared in pellet form, if desired, each pellet containing a sufficient amount thereof to serve as a satisfactory germicide so that by the addition thereof to small amounts of water, e.g. canisters, buckets, or cups of drinking water, a sanitizing treatment can be conveniently carried out in accordance with the invention in areas not provided with water of assured purity. In treating relatively large quantities of water, e.g. swimming pools or water tanks, the material may be added in bulk.

The complex salt, $NaHSO_4 \cdot Na_2SO_4$, is known and may be prepared by known methods. Effective methods of preparing mixtures of $NaHSO_4$ and $NaHSO_4 \cdot Na_2SO_4$ for use in the practice of the invention are set out below. One method is as follows:

Admix, in aqueous solution, $NaHSO_4$ and $NaCl$ at between 110° and 180° C. in amounts so as to provide an excess of the $NaHSO_4$ over that required according to the reaction represented by the equation:

$$NaHSO_4 + NaCl \rightarrow Na_2SO_4 + HCl$$

Upon cooling the resulting molten salt mixture to below 110° C., excess $NaHSO_4$ combines with $Na_2SO_4$ to yield $NaHSO_4 \cdot Na_2SO_4$.

Another method of preparing a satisfactory mixture of $NaHSO_4$ and $NaHSO_4 \cdot Na_2SO_4$ is to admix $H_2SO_4$ and $NaCl$, in aqueous solution at about 110° C. in amounts so as to provide an excess of $H_2SO_4$ over that required according to the reaction represented by the equation:

$$2NaCl + H_2SO_4 \rightarrow Na_2SO_4 + 2HCl$$

Excess $H_2SO_4$ then reacts with some $Na_2SO_4$ to yield $NaHSO_4$ which in turn reacts with additional $Na_2SO_4$ to yield a mixture of $NaHSO_4$ and $NaHSO_4 \cdot Na_2SO_4$ which is subsequently recovered by evaporation.

A further method or preparing $NaHSO_4$ intermixed with the complex salt, $NaHSO_4 \cdot Na_2SO_4$, is to admix solid particulate $Na_2SO_4$ with a saturated aqueous solution of $NaHSO_4$ at somewhat below 110° C. to yield the desired complex, $NaHSO_4 \cdot Na_2SO_4$ in solution, which is then recovered by evaporation.

A particularly practical and economical method of preparing $NaHSO_4$ containing at least 5 percent by weight thereof of the complex $NaHSO_4 \cdot Na_2SO_4$ is that described in my copending application, S.N. 2350, filed January 14, 1960, now U.S. Patent 3,017,245, wherein a caustic salt solution, i.e. the effluent from a chlorine cell, is admixed with 12 to 65 per cent by weight thereof, of about 60° Baumé sulfuric acid, the temperature raised and maintained sufficiently high to boil off the HCl produced, and the resulting aqueous solution evaporated to dryness to yield a mixed salt consisting of between 5 and 10 percent by weight of the complex $NaHSO_4 \cdot Na_2SO_4$ and balance $NaHSO_4$.

The $NaHSO_4$-$NaHSO_4 \cdot Na_2SO_4$ mixed salt used in the examples of the invention, hereinafter set forth, was prepared, employing the last described method, the details of which were as follows:

A caustic salt, recovered from cell effluent, consisting by weight of 20 percent $Na_2SO_4$, 68 percent NaCl, 10.5 percent water, and 1.5 percent NaOH, was admixed with 60° Bé. sulfuric acid at 50° C. in the proportion of 145 parts by weight of the salt to 23 parts by weight of the acid. The unreacted NaCl was then determined and sufficient sulfuric acid admixed therewith to react with the NaCl. The resulting composition was evaporated to dryness at between 165° and 170° C. to evolve HCl and $H_2O$. The final product was analyzed and found to be 9.23 percent $NaHSO_4 \cdot Na_2SO_4$, 88.3 percent $NaHSO_4$, and balance water.

In the practice of the invention it is recommended that a soluble carbonate, preferably $Na_2CO_3$, either in its anhydrous form or in one of its hydrated forms, e.g. $Na_2CO_3 \cdot H_2O$ or $Na_2CO_3 \cdot 10\ H_2O$, be added to the bromide-bromate mixture containing the complex $$NaHSO_4 \cdot Na_2SO_4$$

complex salt. The carbonate, upon subsequently being admixed with an acidic aqueous solution, releases $CO_2$ with an accompanying effervescence and turbulence which automatically distributes the reactants through the body of aqueous solution, thereby substantially insuring treatment of the entire body of water or liquid being treated.

Bearing in mind that the required percent of the complex salt, $NaHSO_4 \cdot Na_2SO_4$ must be present, the following equations are thought to be representative of the reactions taking place in an iron oxide-stained bowl containing an aqueous solution:

$$2NaHSO_4 + Na_2CO_3 \rightarrow 2Na_2SO_4 + CO_2 + H_2O$$
$$Fe_2O_3 + 6NaHSO_4 \rightarrow Fe_2(SO_4)_3 + 3Na_2SO_4 + 3H_2O$$
$$NaBrO_3 + 6NaBr + 6NaHSO_4 \rightarrow 3Br_2 + 6Na_2SO_4 + 3H_2O$$

The invention may be carried out by intermixing, in the dry state, an alkali metal bromate and an alkali metal bromide, and an alkali metal bisulfate containing at least 5 percent and preferably about 7 or more percent, by weight of the bisulfate, of the double salt of an alkali metal bisulfate and the same alkali metal sulfate. A dry mixture of $NaBrO_3$, $NaBr$, $NaHSO_4$ and $$NaHSO_4 \cdot Na_2SO_4$$

$Na_2CO_3$ may also be present, if desired is illustrative of the composition of the invention. The reactants may be employed in any amount sufficient to provide a substantial proportion of the stoichiometric quantities required by the above equations. The bromide and bromate are usually intermixed in the stoichiometric quantities required by the equation above, in the interests of economy and greatest effectiveness. It is desirable that an excess of the $NaHSO_4$, containing the double salt, over the stoichiometric quantity shown in the equation above, be employed to encourage the reaction, as above represented, to progress toward the right, i.e. in the direction of the release of greater quantities of bromine.

The following example illustrates the release of elemental bromine when the ingredients of the composition are admixed in the presence of water:

2.575 grams of NaBr were dry mixed with 0.755 gram of $NaBrO_3$ and the resulting mixture placed in a reaction vessel equipped with an agitation means, a drying tube, a burette, a line leading from a source of air under pressure, and a connecting line leading from the upper part of the reaction vessel into the upper part of a bromine scrubber vessel. 8 milliliters of an aqueous solution, containing 4.379 grams of a mixed salt consisting (in the dry state) of 9.23 percent $NaHSO_4 \cdot Na_2SO_4$ and balance substantially $NaHSO_4$, were added by means of the burette to the bromate-bromide mixture in the reaction vessel, accompanied by agitation. Bromine was produced by the ensuing reaction. Air was admitted into the reaction vessel and forced the bromine into the bromine scrubber vessel. 500 milliliters of a test solution consisting of 15 grams of KI, 5 milliliters of concentrated hydrochloric acid, a few drops of starch indicator, and balance water were added to the bromine scrubber vessel whereby the free bromine oxidized the iodine in the KI. A measured quantity of a 0.1 N aqueous solution of $Na_2S_2O_3$ was then added slowly to the thus liberated free iodine in the scrubber and the percent bromine, which had been produced by the reaction of the bromate, bromide, sodium bisulfate, and $$NaHSO_4 \cdot Na_2SO_4$$

was thus quantitatively determined. A total of 281.10 ml. of 0.1 N $Na_2S_2O_3$ was used. It was found that the amount of bromine produced was substantially the stoichiometric quantity resulting from the reaction represented by the equation set out hereinabove.

To show the substantially non-hygroscopic property of the composition of the invention, the following example was run:

A sample of a mixture of $NaHSO_4$ and the complex salt $NaHSO_4 \cdot Na_2SO_4$ was analyzed, employing X-ray diffraction techniques, and was found to contain 88.3 percent $NaHSO_4$ and 11.7 percent $Na_2SO_4$, by weight. By calculation, 11.7 percent $Na_2SO_4$ shows the presence of 21.9 percent of the complex salt, $NaHSO_4 \cdot Na_2SO_4$, in the salt mixture. The salt mixture was then allowed to stand exposed to moist air for about a week and was again analyzed. No change in chemical composition was found.

To compare the hygroscopicity of the salt mixture, thus analyzed, to a sample known to consist of $NaHSO_4$ with a possible trace of the complex salt $NaHSO_4 \cdot H_2SO_4$, the latter sample was exposed for about a week to air having substantially the same moisture content as that to which the mixture of $NaHSO_4$ and $NaHSO_4 \cdot Na_2SO_4$ employed in the invention had been exposed, as described above. The $NaHSO_4$ sample was analyzed and the chief constituent found to be the monohydrate, $NaHSO_4 \cdot H_2O$. The test shows the hygroscopic nature of $NaHSO_4$.

To show the antimicrobial effect of the composition of the invention, 2.84 liters (3 quarts) of water, infested at about room temperature (20° C.) with a microbe known as *Salmonella typhosa*, was admixed with 100.004 grams of a mixture consisting of 0.004 gram of a mixture of sodium bromate and sodium bromide in a 1 to 5 molar ratio, 80 grams of sodium bisulfate containing about 5.85 percent of the complex sodium bisulfate-sodium sulfate complex (based on the weight of the sodium bisulfate), and 20 grams of anhydrous sodium carbonate (to provide effervescence) and allowed to remain in contact therewith for 5 minutes. Thereafter a culture was taken on the thus treated water as described in "The Official Methods of Analysis," A.O.A.C., 8th ed. (1955). The microbe therein was found to have been inhibited from further growth within 5 minutes. For comparison, 80 grams of $NaHSO_4$ and 20 grams of anhydrous sodium carbonate were dissolved in 2.84 liters of water and the test repeated. No inhibition of microbe growth occurred.

For further comparison aqueous phenol solutions were prepared in accordance with known practice for inhibiting microbial growth. The solutions prepared were 1 part phenol per 90 parts water and 1 part phenol per 100 parts water by weight. The solutions so prepared were infested with the *Salmonella typhosa* similarly as above. At the end of 5 minutes the growth of the microbe had not been inhibited. This shows the relative ineffectiveness of the known compositions to destroy microorganisms when contrasted to the composition of the invention.

The composition of the example above, illustrative of the invention, was placed in a china bowl having deep iron rust stains about the inner surface thereof. The iron rust stains were completely removed almost immediately by the ensuing reaction.

It is clear from a study of the examples that the composition of the invention which may conveniently be employed as a dry composition of matter, is substantially non-hydroscopic and chemically stable at normal atmospheric conditions, can be prepared, stored, and shipped with safety and without degradation of quality, and has extensive utility as a disinfectant, antiseptic, and cleanser for rendering germ-infected water potable, for maintaining hygenic conditions in swimming pools and other water sources, and for cleaning vessels which are contacted by water containing microbes and staining ingredients.

Having described the invention, what I claim and desire to have protected by Letters Patent is:

1. An antimicrobial composition for admixture with aqueous solutions consisting essentially of an alkali metal bromate, an alkali metal bromide, an alkali metal bisulfate, and at least 5 percent by weight of said bisulfate of the double salt consisting of substantially equimolar ratio of an alkali metal bisulfate and an alkali metal sulfate.

2. An antimicrobial composition consisting essentially of a soluble bromate, a soluble bromide, a soluble bisulfate, and at least 5 percent of said bisulfate of a soluble double salt composed of a bisulfate and a sulfate complex salt of the same metal.

3. An antimicrobial composition for the release of bromine in aqueous solutions when admixed therewith consisting essentially of about the stoichiometric quantities of $NaBrO_3$ and $NaBr$, and an excess of the stoichiometric quantity of $NaHSO_4$, in accordance with the equation:

$$NaBrO_3 + 5NaBr + 6NaHSO_4 \rightarrow 3Br_2 + 6Na_2SO_4 + 3H_2O$$

and containing at least 5 percent, by weight of said $NaHSO_4$, of the complex $NaHSO_4 \cdot Na_2SO_4$ double salt.

4. A composition of matter having antimicrobial and cleansing properties when admixed with an aqueous solution consisting essentially of sufficient amounts of $NaBrO_3$, $NaBr$, $Na_2CO_3$, and $NaHSO_4$ to provide at least a substantial portion of the stoichiometric quantity of the reactants required by the following equations:

$$2NaHSO_4 + Na_2CO_3 \rightarrow 2Na_2SO_4 + CO_2 + H_2O$$
$$Fe_2O_3 + 6NaHSO_4 \rightarrow Fe_2(SO_4)_3 + 3Na_2SO_4 + 3H_2O$$
$$NaBrO_3 + 5NaBr + 6NaHSO_4 \rightarrow 3Br_2 + 6Na_2SO_4 + 3H_2O$$

and at least 5 percent, by weight of the $NaHSO_4$, of the double salt $NaHSO_4 \cdot Na_2SO_4$.

5. The composition of claim 4 wherein the $NaBrO_3$ and $NaBr$ are present in substantially the stoichiometric quantities and $NaHSO_4$ is present in excess of the stoichiometric quantity required in said equations.

6. The method of arresting microbial growth in an aqueous solution which comprises admixing with said solution an antimicrobial composition consisting essentially of an alkali metal bromate, an alkali metal bromide, an alkali metal bisulfate, and at least 5 percent by weight of said bisulfate of the double salt consisting of an equimolar ratio of an alkali metal bisulfate and an alkali metal sulfate.

7. The method of cleansing a vessel and arresting microbial growth in an aqueous solution contained in said vessel which comprises admixing with said solution an antimicrobial composition consisting essentially of $NaBrO_3$, $NaBr$, $Na_2CO_3$, and $NaHSO_4$ in amounts sufficient to provide at least a substantial portion of the stoichiometric quantity of the reactants required by the following equations:

$$NaBrO_3 + 5NaBr + 6NaHSO_4 \rightarrow 3Br_2 + 6Na_2SO_4 + 3H_2O$$
$$2NaHSO_4 + Na_2CO_3 \rightarrow 2Na_2SO_4 + CO_2 + H_2O$$
$$Fe_2O_3 + 6NaHSO_4 \rightarrow Fe_2(SO_4)_3 + 3Na_2SO_4 + 3H_2O$$

and at least 5 percent, by weight of the $NaHSO_4$, of the double salt $NaHSO_4 \cdot Na_2SO_4$.

8. The method in accordance with claim 7 wherein the $NaBrO_3$ and $NaBr$ are present in substantially the stoichiometric quantities and the $NaHSO_4$ is present in excess of the stoichiometric quantity required in said equations.

References Cited in the file of this patent

UNITED STATES PATENTS

| | | |
|---|---|---|
| 2,662,855 | Kamlet | Dec. 15, 1953 |
| 2,918,400 | Loonam | Dec. 22, 1959 |